(12) United States Patent
Billod et al.

(10) Patent No.: US 10,868,348 B2
(45) Date of Patent: Dec. 15, 2020

(54) PASSIVE RF DEVICE INCLUDING FIRST AND SECOND CORE PARTS CONFIGURED TO BE JOINED AT MOUNTING FACES TO EACH OTHER BY USING AN ALIGNMENT PIN AND GLUE

(71) Applicant: SWISSto12 SA, Ecublens (CH)

(72) Inventors: Mathieu Billod, Presilly (FR); Mirko Favre, Cully (CH); Emile de Rijk, Lausanne (CH)

(73) Assignee: SWISSTO12 SA, Renens VD (CH)

( * ) Notice: Subject to any disclaimer, the term of this patent is extended or adjusted under 35 U.S.C. 154(b) by 0 days.

(21) Appl. No.: 16/223,203

(22) Filed: Dec. 18, 2018

(65) Prior Publication Data

US 2019/0190113 A1 Jun. 20, 2019

(30) Foreign Application Priority Data

Dec. 20, 2017 (FR) ...................................... 17 71399

(51) Int. Cl.
| | | |
|---|---|---|
| *H01P 1/04* | (2006.01) | |
| *H01P 11/00* | (2006.01) | |
| *H01P 3/123* | (2006.01) | |
| *H01P 3/12* | (2006.01) | |
| *B33Y 80/00* | (2015.01) | |
| *B29D 11/00* | (2006.01) | |
| *B33Y 10/00* | (2015.01) | |
| *B29C 64/10* | (2017.01) | |

(52) U.S. Cl.
CPC ........ *H01P 1/042* (2013.01); *B29D 11/00663* (2013.01); *B33Y 80/00* (2014.12); *H01P 3/12* (2013.01); *H01P 3/122* (2013.01); *H01P 3/123* (2013.01); *H01P 11/002* (2013.01); *B29C 64/10* (2017.08); *B33Y 10/00* (2014.12)

(58) Field of Classification Search
CPC .. H01P 3/12; H01P 3/122; H01P 1/042; H01P 11/002; H01P 11/001
USPC ......................................... 333/239, 248, 254
See application file for complete search history.

(56) References Cited

U.S. PATENT DOCUMENTS

| | | | |
|---|---|---|---|
| 3,577,105 A | 5/1971 | Jones, Jr. | |
| 5,398,010 A * | 3/1995 | Klebe | .................. H01P 11/002 156/150 |
| 6,768,401 B2 * | 7/2004 | Koriyama | ............... H01P 1/042 333/248 |

(Continued)

FOREIGN PATENT DOCUMENTS

| | | |
|---|---|---|
| FR | 2282172 A1 | 3/1976 |
| WO | 2017208153 A1 | 12/2017 |

OTHER PUBLICATIONS

D'Auria, Mario, et al., "3-D Printed Metal-Pipe Rectangular Waveguides", IEEE Transaction on Components, Packaging and Manufacturing Technology, vol. 5, No. 9, Sep. 2015.

(Continued)

*Primary Examiner* — Benny T Lee
(74) *Attorney, Agent, or Firm* — Pearne & Gordon LLP (57) ABSTRACT

A passive radiofrequency device includes a core formed by the gluing of multiple parts in direct contact against one another. At least one of the parts includes a housing for glue. At least some of the parts are manufactured individually by additive manufacturing. A conductive metal jacket surrounds the core without separating the parts from one another.

18 Claims, 5 Drawing Sheets

(56) References Cited

U.S. PATENT DOCUMENTS

| | | |
|---|---|---|
| 2012/0033931 A1 | 2/2012 | Usui et al. |
| 2012/0084968 A1 | 4/2012 | Nath et al. |
| 2014/0347144 A1* | 11/2014 | Nath et al. ............. G02B 6/125 333/100 |
| 2018/0151935 A1* | 5/2018 | Chang et al. ............. C09J 5/04 |

OTHER PUBLICATIONS

Zhu, Ruoyu, et al., "Versatile Manufacturing of Split-Block Microwave Devices Using Rapid Prototyping and Electroplating", IEEE Antennas and Wireless Propagation Letters, vol. 16, 2017.

* cited by examiner

PASSIVE RF DEVICE INCLUDING FIRST AND SECOND CORE PARTS CONFIGURED TO BE JOINED AT MOUNTING FACES TO EACH OTHER BY USING AN ALIGNMENT PIN AND GLUE

FIELD OF THE INVENTION

The present invention relates to a method for additive manufacturing of a passive radiofrequency device, and a passive radiofrequency device manufactured according to this method.

DESCRIPTION OF RELATED ART

Passive radiofrequency devices are used to propagate or to manipulate radiofrequency signals without using active electronic components. Passive radiofrequency devices for example comprise passive waveguides based on the guiding of waves in hollow metal channels, filters, antennas, mode converters, etc. Such devices can be used for signal routing, frequency filtering, signal separation or recombination, signal transmission or reception in or from free space, etc.

As an example, a conventional passive radiofrequency device consists of a waveguide formed by a hollow tube, the form and proportions of which determine the propagation characteristics for a given electromagnetic signal wavelength. The conventional waveguides used for radiofrequency signals have internal apertures of rectangular or circular section. The conventional waveguides having the internal apertures of rectangular or circular section make it possible to propagate electromagnetic modes corresponding to different electromagnetic field distributions along their section.

Radiofrequency devices are typically used outdoors, for example in aerospace (aeroplane, helicopter, drone) to equip a spacecraft in space, on a boat at sea or on a submarine craft, on vehicles moving in desert or in high mountains, each time in hostile, even extreme conditions. In these environments, the radiofrequency devices are in particular exposed to:
  extreme pressures and temperatures which vary significantly which induces repeated thermal shocks;
  mechanical stress, the waveguide being incorporated in a vehicle which undergoes shocks, vibrations and loads which impact the waveguide;
  hostile weather and environmental conditions in which the vehicles equipped with waveguides move around (wind, ice, humidity, sand, salt, fungi/bacteria).

To address these constraints, waveguides are known that are formed by assembly of previously machined metal plates, which make it possible to manufacture waveguides suitable for moving around in hostile environments. On the other hand, the manufacturing of these waveguides is often difficult, costly and difficult to adapt to the manufacturing of waveguides that are light and have complex forms.

US2012/0033931A1 describes a waveguide formed by a part with a U-shaped section and a cover covering this part. The two components are assembled and welded together.

Recent works have demonstrated the possibility of producing passive radiofrequency devices, including antennas, waveguides, filters, converters, etc., using additive manufacturing methods, for example by 3D printing. Particularly well known is the additive manufacturing of waveguides comprising both non-conductive materials, such as polymers or ceramics, and conductive metals.

Waveguides comprising ceramic or polymer walls manufactured by an additive method then covered by a metal plating have in particular been suggested. The inner surfaces of the waveguide must in fact be electrically conductive to work. The use of a non-conductive core makes it possible on the one hand to reduce the weight and the cost of the device, on the other hand to implement 3D printing methods suited to polymers or ceramics and allowing for the production of high-precision parts with low roughness.

As an example, the article by Mario D'Auria et al, "3-D PRINTED METAL-PIPE RECTANGULAR WAVEGUIDES", 21 Aug. 2015, IEEE Transactions on components, packaging and manufacturing technologies, Vol. 5, No 9, pages 1339-1349, describes, in section III, a method for manufacturing a core of a waveguide by fused deposition modelling (FDM).

Waveguides are for example produced by additive manufacturing and comprise a non-conductive core manufactured for example by stereolithography, by selective laser melting, by selective laser sintering, or by another additive method. This core typically comprises an internal aperture for the propagation of the radiofrequency signal. The inner walls of the core around the aperture can be coated with an electrically conductive coating, for example a metal plating.

The additive manufacturing of passive radiofrequency devices makes it possible to produce devices of complex form that would be difficult or even impossible to produce by machining. Additive manufacturing does however have its own constraints and does not allow for the manufacturing of certain forms or parts of large dimensions. Also, the post-manufacturing rework operations, for example cleaning, polishing, drilling, etc., are difficult to perform inside concave parts, for example inside a waveguide channel.

US2012/0084968A1 describes a method for manufacturing passive waveguides in multiple parts produced by 3D printing then metallized before being assembled. The manufacturing in multiple parts makes the method more flexible and makes it possible to produce parts of complex form that would be impossible to print in a single operation. However, this method creates discontinuities of the metal layer at the join between the different metallized parts, which disrupt the transmission of the signal in the waveguide. Also, the accurate adjustment of the different parts is difficult to guarantee, and can scarcely be improved by polishing or adjusting the metal layer which is generally too thin.

BRIEF SUMMARY OF THE INVENTION

One aim of the present invention is to propose a passive radiofrequency device that is free from or minimizes the limitations of the known devices.

One aim of the invention is in particular to provide a passive radiofrequency device, for example a waveguide, produced by additive manufacturing.

According to the invention, these aims are achieved in particular by means of a passive radiofrequency device comprising:
  a core formed by the assembly of several parts in direct contact against one another, at least one of the parts comprising a housing for glue, at least some of the parts being manufactured individually by additive manufacturing;
  a conductive metal jacket surrounding the core without separating said parts from one another.

This device offers the advantage of a conductive jacket which can be deposited after the assembly of the parts, which guarantees a conductive layer without discontinuities.

The gluing of the parts forming the core guarantees the rigid securing thereof.

The presence of housings for the glue makes it possible to avoid the presence of a film of glue between the main surfaces of the assembled parts, which guarantees a relative positioning that is accurate and independent of the thickness or of the flatness of the film of glue.

The housing can be composed of a notch, a groove, or a blind hole of round, square or rectangular section, forming a concave cavity on a surface of the part intended to be placed in contact with another part during assembly.

The parts can be glued together by means of a glue filled with metal or ceramic particles to facilitate the assembly.

The different parts forming the core can be aligned with one another using at least one screw or pin.

The pin or pins can extend at right angles to the surface of the part intended to be placed in contact with another part during assembly, and be inserted into a blind hole provided in the corresponding surface of the assembled part.

The pin or pins can be metal or made of other materials. They can be driven into the part after the additive manufacturing.

The different parts forming the core can be screwed together using at least one screw. The screw or screws can be metal or made of other materials.

The screws can be inserted during assembly.

The screws can be removed after the hardening of the glue and before the deposition of the conductive jacket. That makes it possible to avoid the deposition of a conductive layer on the screw heads, and thus to guarantee a better flatness of the conductive jacket.

The different parts forming the core can be welded together.

The different parts forming the core can be fused without the addition of material between them, for example by ending the hardening thereof after assembly. For example, in the case of parts produced by 3D polymer printing, the parts can be joined by a thermal or UV hardening after the assembly thereof.

In one embodiment, the conductive metal jacket covers all the faces of the core without interruption.

In another embodiment, the device consists of a waveguide provided with lateral walls with outer and inner surfaces, the inner surfaces delimiting a channel, said conductive jacket covering said inner surface but not all of the outer surface.

The thickness of the conductive metal layer is advantageously at least equal to five times the skin depth δ, preferably at least twenty times the skin depth δ. This significant thickness is not necessary for the signal transmission, but contributes to the rigidity of the device, which is thus guaranteed by the metal jacket despite a core made of multiple parts potentially less rigid than a monolithic core.

The skin depth δ (delta) is defined as:

$$\delta = \sqrt{\frac{2}{\mu 2\pi f \sigma}}$$

in which μ (mu) is the magnetic permeability of the plated metal, f is radiofrequency of the signal to be transmitted and σ (rho) is the electrical conductivity of the plated metal. Intuitively, it is the thickness of the zone where the current is concentrated in the conductor, at a given frequency.

This solution offers the particular advantage over the prior art of providing waveguides assembled by additive manufacturing which are more resistant to the stresses to which they are exposed (thermal, mechanical, meteorological and environmental stresses).

In the radiofrequency devices assembled by additive manufacturing according to the existing methods, the structural, mechanical, thermal and chemical properties depend essentially on the properties of the core. Typically, waveguides are known in which the conductive layer deposited on the core is very thin, less than the skin depth of the metal forming the conductive layer. Thus, it was generally accepted that to improve the structural and mechanical properties of the waveguides, it was necessary to increase the thickness and/or the rigidity of the core. It was also accepted that the thickness of the conductive skin layer had to be reduced in order to lighten the structure.

By increasing the thickness of the conductive layer to achieve a thickness at least equal to five times the skin depth δ of the metal of the conductive layer, preferably at least equal to twenty times this depth, the structural, mechanical, thermal and chemical properties of the waveguide depend for the most part, even almost exclusively, on the conductive layer. This unexpected behaviour is observed even though the thickness of the conductive layer remains significantly less than the thickness of the core.

This embodiment makes it possible to reduce, even eliminate, the roughness of the conductive surface. That also makes it possible to reinforce the tensile, torsional, flexural strength of the device, for example the rigidity of the waveguide.

At least two different parts forming the core can be separated from one another on a plane. That facilitates the accurate adjustment of the two parts through the manufacturing of two planar surfaces.

At least two different parts forming the core can be separated from one another along a non-planar surface. The non-planar surface can for example be employed to secure the two parts together, for example using an assembly of tenon-mortise type.

The plane of separation between two parts of the core can be at right angles to the signal propagation direction. It is for example thus possible to manufacture an elongate waveguide from several consecutive linear segments.

The plane of separation between two parts of the core can be parallel to the signal propagation direction.

The device can comprise a smoothing layer intended to at least partially smooth the irregularities of the surface of the core. The conductive jacket is deposited on top of the smoothing layer.

At the end of the additive manufacturing of the core, it has been observed that the additive manufacturing process creates great roughness (for example dips and bumps), in particular on the edges and surface of the core, in particular on the angled edges. These dips and bumps can take the form of staircase treads, each tread representing the addition of a layer of non-conductive material in the additive manufacturing. It has been observed that, after the covering of the core by a thin conductive layer, the roughness of the core remained such that the surface after metallization still exhibited a roughness which disrupted transmission of the RF signal. In this case, the addition of a smoothing layer between the core and the conductive layer makes it possible to reduce, even to eliminate, this roughness which improves the transmission of the RF signal. The smoothing layer can be made of a conductive or non-conductive material.

The thickness of this smoothing layer preferably lies between 5 and 500 micrometres, preferably between 10 and 150 micrometres, preferably between 20 and 150 micrometres. In the case of manufacturing of the core by stereolithography, by selective laser melting, or by selective laser sintering, this thickness makes it possible to effectively smooth the surface irregularities due to the printing method.

The thickness of the smoothing layer is preferably greater than or equal to the roughness (Ra) of the core.

The thickness of the smoothing layer is preferably greater than or equal to the resolution of the core manufacturing method.

When the smoothing layer comprises a weakly-conductive material, for example nickel, the transmission of the RF signal is ensured essentially by the outer conductive metal layer, the influence of the smoothing layer is negligible, and in this case the outer conductive layer has to have a thickness at least equal to five times the skin depth $\delta$, preferably at least equal to 20 times this skin depth.

In one embodiment, the smoothing layer can surround the core without separating said parts from one another. It is thus possible to deposit it after the assembly of the different parts forming the core, and before the deposition of the metal jacket.

In one embodiment, the smoothing layer surrounds the core by separating said parts from one another. The smoothing layer is then deposited before the assembly of the parts forming the core. The smoothing layer makes it possible to improve the accuracy of positioning of the parts by smoothing the surface irregularities of the parts at the join.

The smoothing layer can be formed by nickel.

The device can comprise an adhesion layer (or priming layer) deposited after the assembly of the core so as to cover the core without interruption, the conductive jacket being deposited on top of the adhesion layer, (and on top of the smoothing layer).

The adhesion layer can be made of conductive or non-conductive material. The adhesion layer makes it possible to improve the adhesion of the conductive layer on the core. A thickness of the adhesion layer is preferably less than the roughness Ra of the core, and less than the resolution of the core additive manufacturing method.

In one embodiment, the outer jacket of the device comprises, in succession, a non-conductive core produced by additive manufacturing, an adhesion layer, a smoothing layer and a conductive layer. Thus, the adhesion layer and the smoothing layer make it possible to reduce the roughness of the surface of the waveguide channel. The adhesion layer makes it possible to improve the adhesion of the core, conductive or non-conductive, with the smoothing layer and the conductive layer.

In one embodiment, the metal layer forming the conductive jacket comprises several metal sublayers. When the conductive layer comprises several successive layers of highly conductive metals, for example Cu, Au, Ag, the skin depth $\delta$ is determined by the properties of the metals of all the layers in which the skin current is concentrated.

In one embodiment, the adhesion layer optionally comprises a metal chosen from among Cu, Au, Ag, Ni, Al, stainless steel, brass, zincate, a non-conductive material, for example a polymer or a ceramic, or a combination of these choices.

In one embodiment, the smoothing layer optionally comprises a metal chosen from among Cu, Au, Ag, Ni, Al, stainless steel, brass, a non-conductive material, for example a polymer or a ceramic, or a combination of these choices.

The core of the device can be formed by a polymer material.

The core of the device can be formed by a metal or an alloy, for example aluminium, titanium or steel.

The core of the device can be formed by ceramic.

The core of the device can be produced by stereolithography, by selective laser melting or by selective laser sintering.

The metal layer forming the jacket can optionally comprise a metal chosen from among Cu, Au, Ag, Ni, Al, stainless steel, brass or a combination of these metals.

The strength of the device chosen from among tensile, torsional or flexural strength or a combination of these strengths, can be conferred for the most part by the conductive layer.

The strength of the device chosen from among tensile, torsional or flexural strength or a combination of these strengths, can be conferred for the most part by the conductive layer and by the smoothing layer.

Another subject of the invention is a method for manufacturing a passive radiofrequency device comprising:
   additive manufacturing of multiple parts, at least one part comprising a housing;
   insertion of glue into the housing;
   assembly of the parts together, so as to form a core of the device, at least two parts being in direct contact with one another;
   deposition on the core of a conductive layer, without separating the parts from one another.

This method allows for the manufacturing of complex devices by the assembly of parts produced by additive manufacturing. The metallization after assembly guarantees a conductive jacket without discontinuities.

As will be seen, the manufacturing in multiple parts also allows for a cleaning or a polishing of the parts before the assembly thereof, which makes it possible to clean or polish portions of the device that are difficult to access.

As will be seen, this manufacturing in multiple parts also allows for a polymerization of the parts before the assembly thereof, which makes it possible to expose to ultraviolet rays portions of the device to be hardened that are difficult to access.

According to one embodiment, the deposition of the conductive layer on the core is performed by electrolytic deposition or electroplating, chemical deposition, vacuum deposition, physical vapour-phase deposition (PVD), deposition by printing, deposition by sintering.

In one embodiment of the method, the conductive layer comprises several layers of metals and/or non-metals deposited in succession.

The manufacturing of the core comprises an additive manufacturing step. "Additive manufacturing" is understood to mean any method for manufacturing parts by the addition of material, on the basis of computerized data stored on a computer medium and defining a model of the part. In addition to stereolithography and selective laser melting, the expression also describes other manufacturing methods based on liquid or powder hardening or coagulation in particular, including, without limitation, methods based on inkjets (binder jetting), DED (direct energy deposition), EBFF (electron beam freeform fabrication), FDM (fused deposition modelling), PFF (plastic freeforming), by aerosols, BPM (ballistic particle manufacturing), powder bed, SLS (selective laser sintering), ALM (additive layer manufacturing), polyjet, EBM (electron beam melting), photopolymerization, etc. The manufacturing by stereolithography or by selective laser melting is however preferred because it makes it possible to obtain parts with relatively clean surface conditions, with low roughness.

The method can comprise a step of deposition of a smoothing layer around the core.

The smoothing layer can be deposited before assembly thus separating said parts from one another.

The smoothing layer can be deposited after assembly; in this case, it does not therefore separate the parts of the core from one another.

The manufacturing of the core can comprise a step of additive manufacturing by stereolithography, by selective laser melting or by selective laser sintering.

The manufacturing of the core can comprise a step of polishing before assembly.

The manufacturing of the core can comprise a cleaning step before assembly.

The manufacturing of the core can comprise a hardening step before assembly.

The manufacturing of the core can comprise a hardening step after assembly.

The manufacturing of the core can comprise a pre-hardening step before assembly, and a final hardening step after assembly. The final hardening can be used to fuse the parts together.

The method can comprise the deposition of an adhesion layer around the core.

In the context of the invention, the terms "conductive layer", "conductive coating", "conductive metal layer" and "metal layer" are synonymous and interchangeable.

BRIEF DESCRIPTION OF THE DRAWINGS

Examples of implementation of the invention are indicated in the description illustrated by the attached figures, where like features are denoted by the same reference numerals throughout the drawings, and in which.

DETAILED DESCRIPTION OF THE INVENTION

Figure 1A:
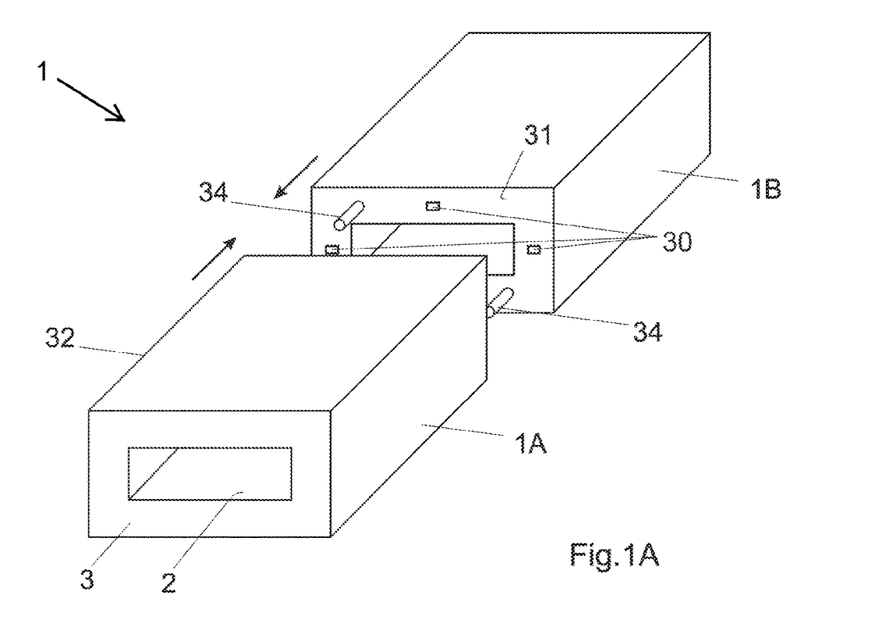
FIG. 1A illustrates a perspective view of two parts intended to be assembled along a joining plane at right angles to the signal propagation direction in order to form a waveguide core.

FIG. 1A illustrates two parts 1A and 1B intended to be assembled together to form the core 3 of a passive radiofrequency device, here a waveguide. The parts are provided with a longitudinal aperture 2 of rectangular section defining a channel for the transmission of the radiofrequency signal. The section of the aperture is determined according to the frequency of the electromagnetic signal to be transmitted. The dimensions of this inner channel and its form are determined as a function of the operational frequency of the device 1, that is to say the frequency of the electromagnetic signal for which the device is manufactured and for which a transmission mode that is stable and optionally with minimum attenuation is obtained.

The two parts 1A and 1B are intended in this example to be juxtaposed one after the other in the direction of transmission of the signal, thus forming a continuous longitudinal channel. The surfaces 31 intended to be placed in contact are planar and at right angles to the direction of transmission of the radiofrequency signal. At least one of these surfaces comprises one or more housings 30 to house glue therein in order to secure the two parts 1A, 1B glued to one another. The housings 30 are provided on the surface 31 of a part (here the part 1B) intended to be placed in contact with another part (1A) during assembly. These housings do not preferably emerge on the outer faces or inner faces intended to be covered with a metal deposition. Thus, the metal layer is deposited only on the core, and not on the glue, which guarantees a regular deposition.

This core 3 delimits an inner channel 2 intended for guiding waves.

The parts 1A, 1B intended to form the core 3 can for example be made of polymer, of epoxy, of ceramic, of organic material or of metal (preferably aluminium, titanium, steel or Invar®, i.e., a nickel-iron alloy).

The parts 1A and 1B are manufactured by additive manufacturing, preferably by stereolithography or by selective laser melting in order to reduce the roughness of the surface. The material of the core can be non-conductive or conductive. The thickness of the walls is for example between 0.5 and 3 mm, preferably between 0.8 and 1.5 mm.

The form of the parts 1A, 1B can be determined by a computer file stored in a computer data medium and making it possible to control an additive manufacturing device.

After manufacture, and before assembly, each of the parts 1A, 1B can be dried, cleaned and/or polished to improve the surface condition. It is also hardened, at least partially. The drying, cleaning, polishing and/or hardening before assembly makes it possible to more easily access the portions of the device that are difficult to access after assembly, for example at the centre of the channel 2. As will be seen, it is also possible to deposit a smoothing layer before assembly.

Figure 1B:
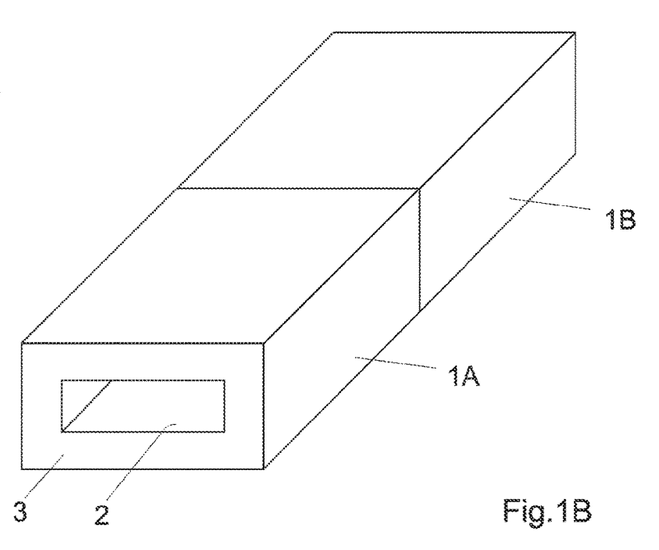
FIG. 1B illustrates a perspective view of the two parts of FIG. 1A after assembly in order to form a waveguide core.

FIG. 1B illustrates the two parts 1A, 1B after assembly so as to form a core 3. The parts are secured by gluing by means of glue deposited in the glue housings 30. The presence of glue on the contact surfaces 31 (shown in FIG. 1A) is preferably avoided, which improves the accuracy of assembly. A glue will however preferably be chosen which allows the deposition of metal with the deposition methods to be retained; thus, the possible presence of traces of glue close to the joint will not cause irregularities in the deposition.

In one embodiment, the different parts forming the core are pre-hardened, for example by heating and/or exposure to an ultraviolet radiation, before the assembly thereof. The different parts forming the core are then juxtaposed, then a final hardening step is performed by once again placing the parts under ultraviolet radiation or in an oven. This solution makes it possible to fuse the parts 1A, 1B together to facilitate the assembly thereof.

At least one pin 34 (shown in FIG. 1A) is preferably inserted into a housing for a pin in one of the contact surfaces 31, so as to extend at right angles to this contact surface. This pin is preferably driven into the housing, and intended to be inserted into a housing provided in the contact face of the facing part 1A. This or these pins guarantee(s) an alignment of the parts 1A, 1B with one another.

Screws (not illustrated) can also be provided to secure the two parts together, at least during the gluing.

A mechanical assembly by fitting in a clip-fastened or tenon-mortise type assembly can also be employed to fix the parts 1A, 1B to one another.

Figure 1C:
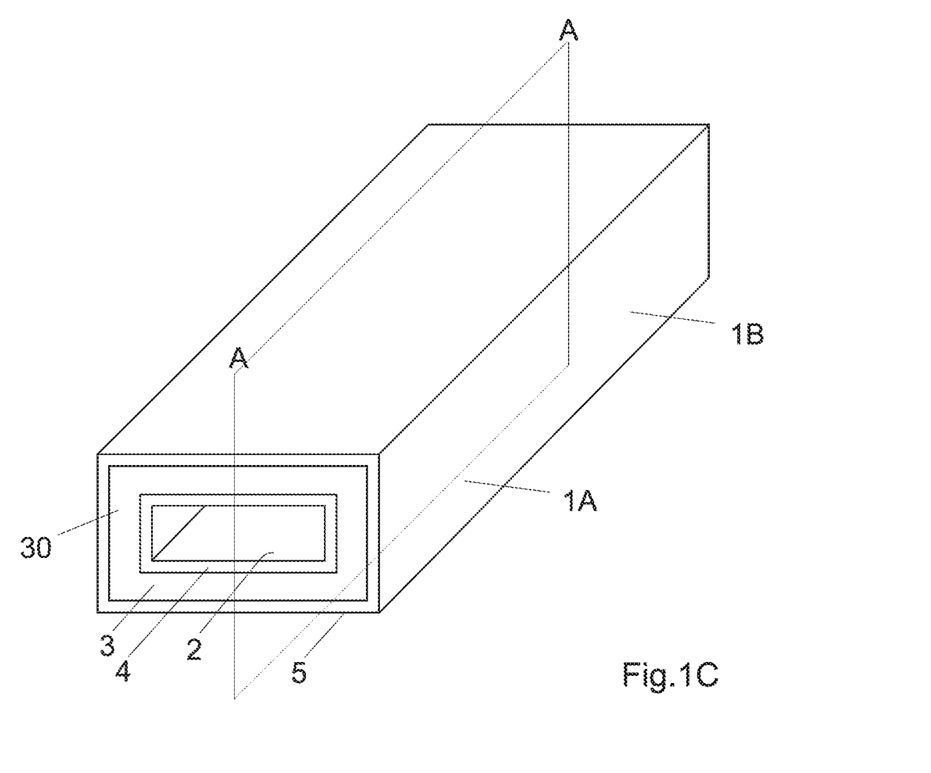
FIG. 1C illustrates a perspective view of a device comprising a core made of two parts assembled and covered by a conductive jacket on the inner and outer walls.

FIG. 1C illustrates the device formed by coating the core 3 by a metal deposition forming a conductive jacket 4, 5 on the inner and outer surfaces of the core 3. The figure illustrates the different layers on the transverse face 32 (shown in FIG. 1A) at the front of the device; in another embodiment, this front face is also metallized such that the inner layers 3, 4 are not visible.

In this embodiment illustrated, the inner surface and the outer surface of the core 3 are covered with a conductive metal layer 4, for example copper, silver, gold, nickel, etc., plated by chemical deposition without electrical current. The thickness of this layer for example lies between 1 and 20 micrometres, for example between 4 and 10 micrometres.

The thickness of this conductive coating 4 must be sufficient for the surface to be electrically conductive at the chosen radiofrequency. This is typically obtained using a conductive layer whose thickness is greater than the skin depth $\delta$.

This thickness is preferably substantially constant over all the inner surfaces in order to obtain a finished part with precise dimensional tolerances for the channel.

The deposition of conductive metal 4, 5 on the inner and possibly outer faces is done by immersing the core 3 after assembly of the parts 1A, 1B in a successive series of baths, typically 1 to 15 baths. Each bath involves a fluid with one or more reagents. The deposition does not entail applying a current to the core to be covered. A stirring and a regular deposition are obtained by stirring the fluid, for example by pumping the fluid into the transmission channel and/or around the device or by vibrating the core 3 and/or the fluid tank, for example with an ultrasound-vibrating device to create ultrasonic waves.

In one embodiment, the thickness of this layer 4 is at least twenty times greater than the skin depth in order to improve the structural, mechanical, thermal and chemical properties of the device. The surface currents are thus concentrated for the most part, even almost exclusively, in this layer.

The application of a metal deposition on the outer surfaces does not contribute to the propagation of the radiofrequency signal in the channel 2, but does however have the advantage of protecting the device from thermal, mechanical or chemical abuses. In an embodiment that is not illustrated, only the inner surface of the core, around the channel 2, is covered with a metal jacket; the outer surfaces are bare, or covered with a different coating.

Figure 1D:
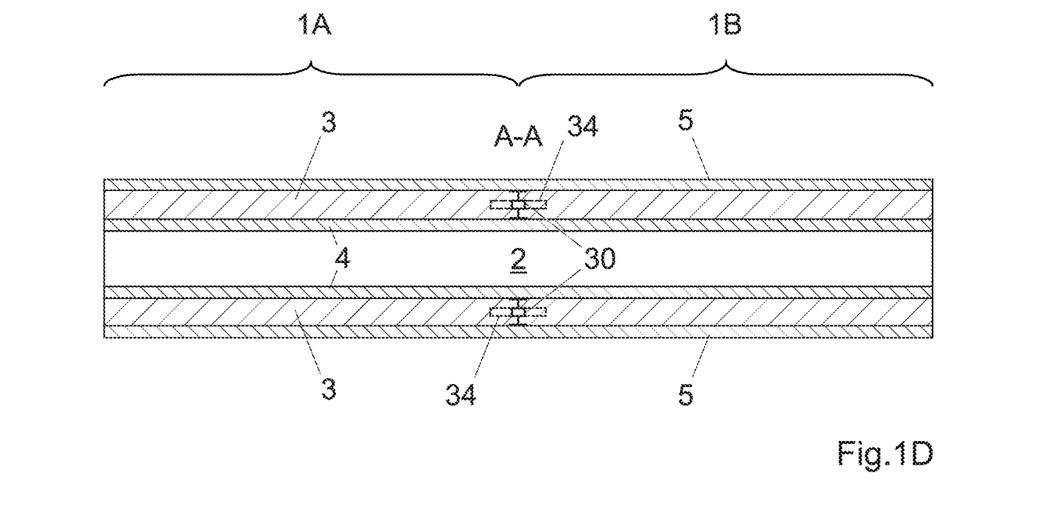
FIG. 1D illustrates a longitudinal cross-sectional view of a device comprising a core in two parts assembled and covered with a conductive jacket on the inner and outer walls.

FIG. 1D illustrates a longitudinal cross-sectional view of the metal device along the plane A-A of FIG. 1C. Particularly visible are the two parts 1A, 1B secured against one another by gluing in the glue housings 30 (FIG. 1C). The securing is also ensured by the continuous metal jacket 4 on the inner and outer surfaces of the core.

Figure 2A:
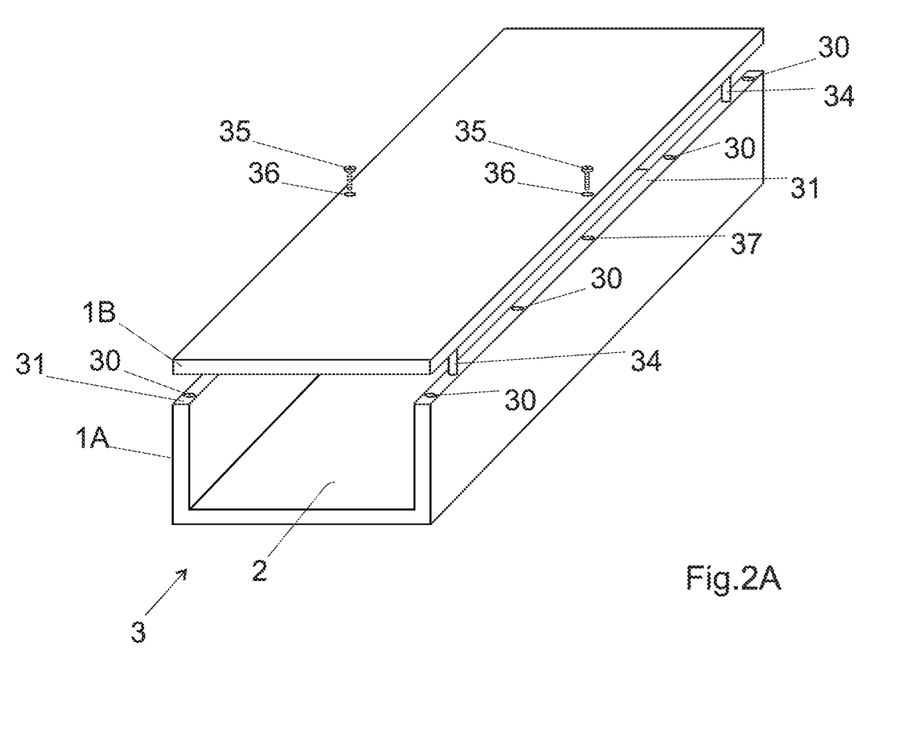
FIG. 2A illustrates a perspective view of two parts intended to be assembled along a joining plane parallel to the signal propagation direction, in order to form a waveguide core.
Figure 2B:
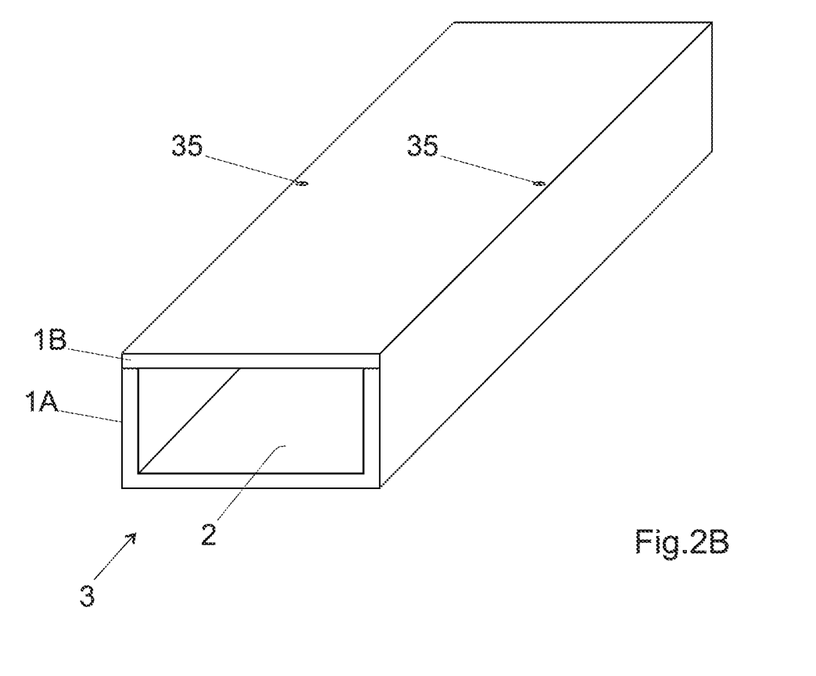
FIG. 2B illustrates a perspective view of the two parts of FIG. 2A after assembly in order to form a waveguide core.
Figure 2C:
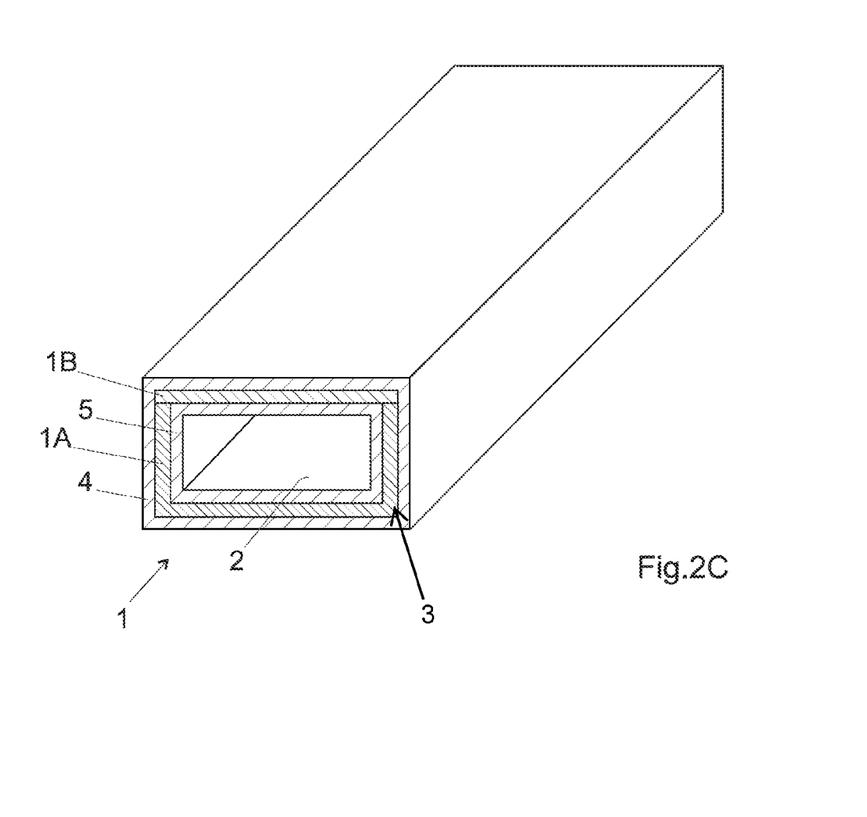
FIG. 2C illustrates a transverse cross-sectional view of a device comprising a core in two parts assembled and covered by a conductive jacket on the inner and outer walls.

FIGS. 2A to 2C illustrate a variant device; all the features and steps described above in relation to FIGS. 1A to 1D apply also this variant, except when indicated otherwise.

FIG. 2A illustrates a variant device in which the core is formed by assembly of two parts 1A and 1B along a plane of separation which extends longitudinally in the direction of propagation of the signal through the channel 2. In this example, the part 1A has a U-shaped section and the part 1B has a rectangular section forming a cover on top of the part 1A. It is also possible to produce a waveguide with rectangular section with two U-shaped parts mounted head-to-tail one on top of the other.

The contact surface 31 of one of the parts 1A comprises housings 30 to house glue therein intended to secure the parts together.

The two parts 1A, 1B are aligned with one another by means of pins 34 extending from, in other words protruding from the surface of one of the parts 1A and penetrating into a blind hole in the other part 1B. The pins are thus hidden after assembly.

FIG. 2B shows the core of the device after assembly and gluing of the two parts 1A and 1B.

The two parts 1A, 1B are preferably secured clamped to one another by means of screws 35 passing through holes 36 through one of the parts 1A and engaged in tapped holes 37 (as shown in FIG. 2A) in the other part. These screws can be inserted before gluing, and removed after the hardening of the glue. In a variant, it is possible to retain screws which do not disrupt the deposition of the metal jacket.

FIG. 2C shows a transverse cross-sectional view of the device after the coating of the inner and outer faces of the core 3 with a metal jacket.

It is possible to produce a passive radiofrequency device core by assembling more than two parts. It is possible to assemble parts along planes which are neither longitudinal nor transversal, or along non-planar surfaces.

Figure 3A:
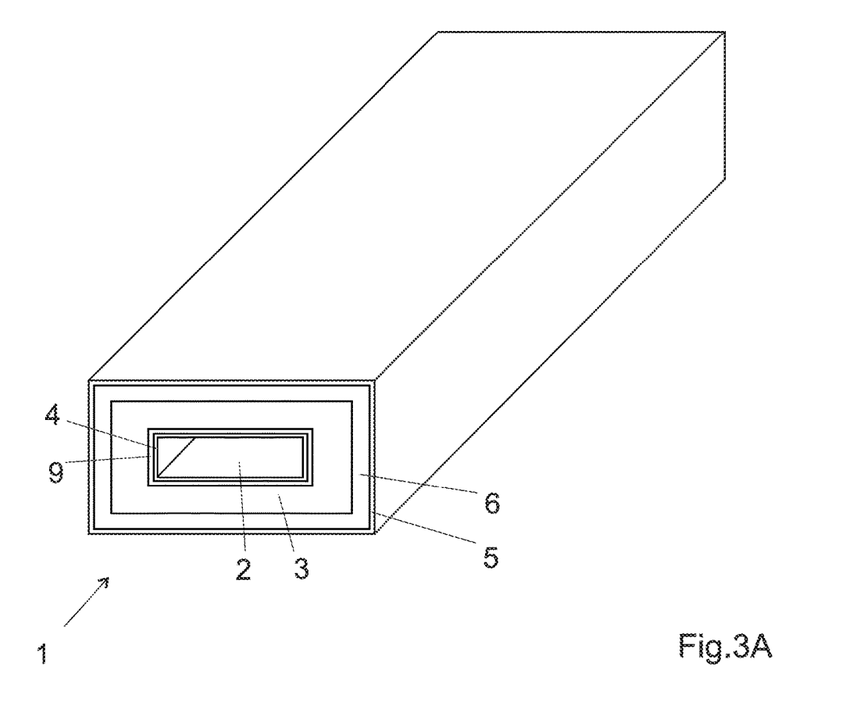
FIG. 3A illustrates a transverse cross-sectional view of a device according to the invention, comprising a core in two parts coated with a smoothing layer and a conductive jacket.
Figure 3B:
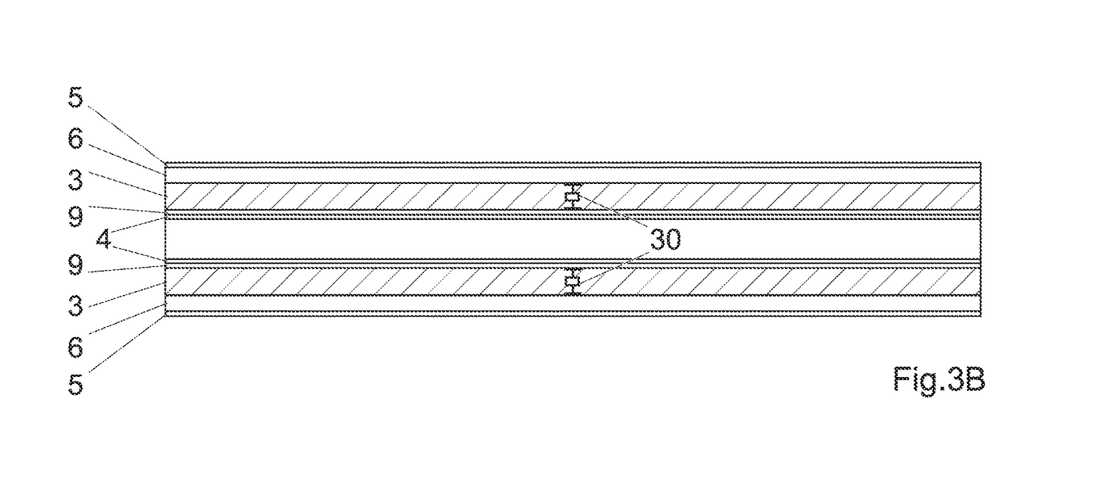
FIG. 3B illustrates a longitudinal cross-sectional view of a device comprising a core in two parts assembled and covered with a smoothing layer and a conductive jacket on the inner and outer walls.

FIGS. 3A and 3B illustrate a variant device; all the features and steps described above in relation to FIGS. 1A to 1D and 2A to 2C apply also to this variant, except when indicated otherwise.

FIG. 3A shows a transverse cross-sectional view of another variant device in which the core 3 is coated by a first smoothing layer 9, 6 then by the conductive layer 4, 5. FIG. 3A shows a longitudinal cross-sectional view of this device.

In the embodiment illustrated in FIG. 3A, the surfaces of the core 3 are covered after assembly with a smoothing layer 9, for example a layer of Ni. The thickness of the smoothing layer 9 is at least equal to the roughness Ra of the surface of the core, or at least equal to the resolution of the 3D printing method used to manufacture the core (the resolution of the 3D printing method determining the roughness Ra of the surface). In one embodiment, the thickness of this layer lies between 5 and 500 micrometres, preferably between 10 and 150 micrometres, preferably between 20 and 150 micrometres. This smoothing layer also determines the mechanical and thermal properties of the device 1. The layer of Ni is then covered with the conductive layer 4, for example of copper, silver, gold, etc.

The smoothing layer makes it possible to smooth the surface of the core and therefore reduce the transmission losses due to the roughness of the inner surface.

In this embodiment, the core 3 is therefore covered with a metal layer formed by a smoothing layer 9 and a conductive layer 4. The total thickness of this metal layer is preferably greater than or equal to five times, preferably twenty times the skin depth $\delta$. The value of the Young's modulus of the device 1 is conferred by the most part by this metal layer. The thickness of the conductive layer 4 can also be on its own greater than or equal to twenty times the skin depth δ. The most conductive layer is preferably deposited last, at the periphery.

The smoothing layer illustrated in this example is deposited after the assembly of the different parts 1A, 1B forming the core; it therefore does not separate the parts, and is not deposited on the joining surfaces 31 between parts.

In an embodiment that is not illustrated, the smoothing layer is deposited before the assembly of the different parts 1A, 1B forming the core; it therefore separates the parts, by covering the joining surfaces 31 between parts. This embodiment makes it possible to obtain joining surfaces 31 between parts 1A, 1B of the core that are smoother, and therefore to improve the accuracy and the rigidity of the assembly.

In an embodiment that is not illustrated, the device 1 comprises an adhesion layer, for example a coat made of Cu, on top of the inner surface and possibly the outer surface of the core 3; this adhesion layer facilitates the subsequent deposition of the smoothing layer 9 if such a layer is provided, or of the conductive layer 4. The thickness of this coat is advantageously less than 30 micrometres. This adhesion layer is preferably deposited after assembly, and does not therefore cover the joining surfaces 31 between parts.

It is also possible to produce passive radiofrequency devices comprising a core formed by the assembly of multiple parts without gluing, at least some of said parts being manufactured individually by additive manufacturing and aligned using pins, a conductive metal jacket being deposited on said core without separating said parts from one another. The other features of the invention described above, apart from the gluing, can also be applied to these devices.

It is also possible to produce passive radiofrequency devices comprising a core formed by the assembly of multiple parts, at least some of said parts being manufactured individually by additive manufacturing and aligned using pins, a conductive metal jacket being deposited on said core without separating said parts from one another, a smoothing layer being deposited on said parts before the assembly thereof. The other features of the invention described above, with or without gluing, can also be applied to these devices.

REFERENCE NUMBERS USED IN THE FIGURES

| | |
|---|---|
| 1 | Passive radiofrequency device |
| 2 | Waveguide channel |
| 3 | Core |
| 30 | Housing for glue |
| 31 | Contact surface |
| 32 | Outer face |
| 34 | Pin |
| 35 | Screw |
| 36 | Through-hole |
| 37 | Blind hole, for example tapped hole |
| 4 | Inner conductive coating |
| 5 | Outer conductive coating |
| 6 | Smoothing or structural layer |
| 9 | Smoothing layer |

The invention claimed is:

1. A passive radiofrequency device comprising:
   a core formed by an assembly of a first part and a second part, each of the first and second parts having a respective mounting face configured to be in direct contact against one another in an assembled state, at least one of said mounting faces having a respective cavity for receiving glue therein, at least one of said mounting faces having a pin extending perpendicularly therefrom, and at least one of the first and second parts being manufactured individually by additive manufacturing; and
   a conductive metal jacket surrounding said core without separating said first and second parts from one another, wherein the first and second parts are aligned with one another via the pin.

2. The device according to claim 1, wherein said first and second parts being glued together by means of a glue filled with metal or ceramic particles to facilitate the assembly.

3. The device according to claim 1, said cavity not emerging on a surface of the core intended for the deposition of said metal jacket.

4. The device according to claim 1, wherein said first and second parts being glued together by means of the glue.

5. The device according to claim 1, wherein at least one of said mounting faces has an aperture configured to receive the pin therein in the assembled state.

6. The device according to claim 1, wherein said first and second parts being provided with screw holes for securing said first and second parts together at least during the gluing.

7. The device according to claim 1, wherein said conductive metal jacket covers surfaces of the core without a interruption and without joint between said first and second parts.

8. The device according to claim 1, wherein a thickness of said conductive metal jacket being at least equal to five time a skin depth δ,
   wherein the skin depth $$\delta = \sqrt{\frac{2}{\mu 2\pi f \sigma}}$$

wherein μ is a magnetic permeability of the conductive metal jacket, wherein f is a radiofrequency of a signal to be transmitted, and wherein σ is an electrical conductivity of the conductive metal jacket.

9. The device according to claim 1, wherein said first and second parts being mirror image shapes of one another about an imaginary plane being perpendicular to a longitudinal axis of the core.

10. The device according to claim 1, further comprising a smoothing layer intended to at least partially smooth irregularities in a surface of the core, the conductive metal jacket being deposited on top of the smoothing layer.

11. The device according to claim 10, wherein said smoothing layer surrounding said core without separating said first and second parts from one another.

12. The device according to claim 1, further comprising an adhesion layer deposited after assembly of the core so as to cover the core without interruption, the conductive metal jacket being deposited on top of the adhesion layer.

13. A method for manufacturing a passive radiofrequency device, the method comprising:
   additive manufacturing of first and second parts, each of the first and second parts having a respective mounting face, at least one of said mounting faces having a respective cavity for receiving glue therein;
   insertion of the glue into said cavity;
   insertion of a pin into at least one of the mounting faces;

assembly of the first and second parts together, so as to form a core of the device, the respective mounting faces of the first and second parts being in direct contact with one another, and the pin promoting correct alignment between the first and second parts; and deposition on the core of a conductive layer, without separating said first and second parts from one another.

14. The method according to claim 13, wherein the step of assembly of the first and second parts together further includes inserting the pin into an aperture formed in at least one of the mounting faces.

15. The method according to claim 13, wherein said glue being inserted only into said cavity, without emerging on a surface of the core intended for the deposition of said conductive layer.

16. The method according to claim 13, further comprising a step of deposition of an adhesion layer around said core.

17. The method according to claim 13, further comprising a step of deposition of a smoothing layer around said core.

18. The method according to claim 17, wherein said smoothing layer being deposited after assembly and thus not separating said first and second parts from one another.

\* \* \* \* \*